United States Patent
Hardin et al.

(10) Patent No.: US 12,208,767 B2
(45) Date of Patent: Jan. 28, 2025

(54) WHEEL LOCKING DEVICE

(71) Applicant: Jungle Jim's Accessory Products, Inc., Louisville, KY (US)

(72) Inventors: Kris Hardin, Louisville, KY (US); James Thomas Hafendorfer, Louisville, KY (US)

(73) Assignee: Jungle Jim's Accessory Products, Inc., Louisville, KY (US)

(*) Notice: Subject to any disclaimer, the term of this patent is extended or adjusted under 35 U.S.C. 154(b) by 143 days.

(21) Appl. No.: 18/115,169

(22) Filed: Feb. 28, 2023

(65) Prior Publication Data
US 2023/0278525 A1 Sep. 7, 2023

Related U.S. Application Data (60) Provisional application No. 63/315,197, filed on Mar. 1, 2022.

(51) Int. Cl.
| | | |
|---|---|---|
| B60R 25/09 | (2013.01) | |
| B60T 1/00 | (2006.01) | |
| E05B 71/00 | (2006.01) | |
| B60P 7/08 | (2006.01) | |

(52) U.S. Cl.
CPC ............ B60R 25/093 (2013.01); B60T 1/005 (2013.01); E05B 71/00 (2013.01); *B60P 7/08* (2013.01)

(58) Field of Classification Search
CPC ....... E05B 71/00; B60R 25/09; B60R 25/093; B60R 25/096; B60P 3/064; B60P 3/075; B60P 3/077; B60P 7/08; B60T 1/005; B60T 1/04

See application file for complete search history.

(56) References Cited

U.S. PATENT DOCUMENTS

| | | | | |
|---|---|---|---|---|
| 3,783,659 | A * | 1/1974 | Rossi | B62H 3/10 D12/115 |
| 3,865,244 | A * | 2/1975 | Galen | B62H 3/08 211/5 |
| 3,964,610 | A * | 6/1976 | Deiner | B62H 3/08 211/5 |
| 3,964,611 | A * | 6/1976 | Galen | B62H 3/08 211/8 |

(Continued)

FOREIGN PATENT DOCUMENTS

CN 201512043 U 6/2010

OTHER PUBLICATIONS

Ballard Inc.; Lock Down Your Push Mowers! The All New Wheel Locker From Ballard Products!; "How to video" on youtube; accessed video May 1, 2023; p. 1; https://www.youtube.com/watch?v=26p8oc12yWM.

(Continued)

*Primary Examiner* — Christopher J Boswell
(74) *Attorney, Agent, or Firm* — Wyatt, Tarrant & Combs, LLP; Max E. Bridges; Matthew A. Williams (57) ABSTRACT

A wheel locking device comprising a number of interlocking components that are adapted to receive a wheel (or a wheeled apparatus), and said components can be adjusted to accommodate a variety of wheels of different diameters. The wheel locking device further comprises a rotatable and adjustable bar that is utilized to secure the wheel in place. In further embodiments, the device comprises a lock receiving bore which is adapted to receive a lock.

17 Claims, 12 Drawing Sheets

(56) References Cited

U.S. PATENT DOCUMENTS

| | | | |
|---|---|---|---|
| 7,117,700 B2* | 10/2006 | Smith | B60R 25/093 211/20 |
| 9,555,744 B1* | 1/2017 | Roth | B60R 9/10 |
| 11,813,973 B2* | 11/2023 | Seale | B60T 3/00 |
| 2003/0226867 A1 | 12/2003 | Knizner | |
| 2008/0008571 A1* | 1/2008 | Baughan | B60P 3/077 414/426 |
| 2008/0060886 A1* | 3/2008 | Erghott | B60P 3/077 188/32 |
| 2009/0232628 A1* | 9/2009 | Miller | B60P 3/077 414/462 |
| 2018/0201202 A1 | 7/2018 | Phillips | |
| 2024/0083534 A1* | 3/2024 | Hoadley | B60P 3/077 |

OTHER PUBLICATIONS

Ballard Inc.; Wheel Locker (Small); accessed May 1, 2023; pp. 1-3; https://www.ballard-inc.com/wheel-locker-%28small%29/WLOCKER-1.html?lang=default.

Jungle Jim's Accessory Products; Jungle Boot Small (Mower Wheel Bracket) with Side Grip; accessed May 1, 2023; pp. 1-6; https://www.junglejimsap.com/collections/transport-lockdowns/products/jungle-boot-small-to-secure-push-mowers-on-your-open-or-enclosed-trailers.

Jungle Jim's Accessory Products;Scratch and Dent Jungle Boot Large—For Spreaders; access May 1, 2023; pp. 1-7; https://www.junglejimsap.com/collections/transport-lockdowns/products/copy-of-jungle-boot-large-for-spreaders.

The United States Patent and Trademark Office; Notification of Transmittal of the International Search Report and the Written Opinion of the International Searching Authority, or the Declaration; Search report for PCT/US23/14039; May 25, 2023; pp. 1-17; The United Patent and Trademark Office; US.

* cited by examiner

WHEEL LOCKING DEVICE

CROSS-REFERENCE TO RELATED APPLICATIONS

This patent application claims the benefit of and priority to U.S. Provisional Patent Application Ser. No. 63/315,197, with a filing date of 1 Mar. 2022, the contents of which are fully incorporated herein by reference.

FIELD OF INVENTION

The embodiments described herein relate to devices for securing a wheel of a wheeled apparatus to secure said apparatus, including but not limited to, securing a lawn mower to a trailer.

BACKGROUND

When transporting wheeled machines, it is often necessary to secure the machine in place in order to prevent damage during transport and/or to prevent theft. However, the conventional approaches are typically not user friendly, not adaptable to different sized wheels, and are often susceptible to theft. As a non-limiting example, when an individual is transporting a lawn mower on a trailer, the individual will typically secure the mower in-place by using bungee cords or straps. However, in this conventional approach, the lawn mower can be easily damaged during transportation because the mower is not tightly secured. Likewise, this conventional approach is prone to theft.

Accordingly, there is a significant need for a wheel locking device that is adaptable to a variety of sized wheels, that is more user friendly, that tightly secures the wheel in place, and prevents theft. Along with other features and advantages outlined herein, the wheel locking device according to multiple embodiments and alternatives meet these and other needs.

SUMMARY OF EMBODIMENTS

According to multiple embodiments and alternatives, the wheel locking device (also referred to herein as the "device") comprises a number of interlocking components that are adapted to receive and restrain a wheel or a wheeled apparatus, and said components can be adjusted to accommodate a variety of wheels of different sizes. In some embodiments, the height, the length, and/or the width of the device can be adjusted by changing the position(s) of the interlocking components. The wheel locking device comprises a rotatable and adjustable bar that can be utilized to secure the wheel in place. The device further comprises a lock receiving bore which is adapted to receive a lock (e.g. a padlock as a non-limiting example), and said lock receiving bore is located in such a position that permits the top of the device to be locked to a portion of the bar.

According to multiple embodiments and alternatives, the wheel locking device comprises a base component that is adjustably connected to a vertical restraining component. The base component and the vertical restraining component each have a plurality of corresponding notches that are adapted to receive nuts and bolts (as a non-limiting example), and the nuts and bolts are utilized to secure the base component to the vertical restraining component. By loosening and removing said nuts and bolts, the position of the vertical restraining component relative to the base component can be adjusted to change the height of the device.

The base component comprises a bottom member having a pair of opposing lengths and the bottom member is adapted to receive a horizontal restraining component (discussed in more detail below). A lip is integrally connected to one of the opposing lengths of the base component and a side member is integrally connected to the other opposing length. Both the lip and the side member extend vertically upward from the bottom member and are positioned at approximately a ninety degree angle relative to the bottom member. The side member defines the plurality of corresponding notches and a pair of parallel slots which are adapted to receive the nuts and bolts that connect the base component to the horizontal restraining component. In further embodiments, the bottom member defines a plurality of slits and a pair of screw receiving bores which can be utilized to secure the device to a surface (e.g. a trailer as a non-limiting example).

The vertical restraining component comprises a vertical member which extends upwards and is integrally connected to a top member which in turn is integrally connected to a lip. The vertical member defines the plurality of notches which are adapted to receive the nuts and bolts, and said notches correspond to the plurality of notches defined by the side member of the base component. The inner face of the vertical member is adapted to engage the outer face of the side member of the base component. A pair of housings are securely attached to an edge of the vertical member and said housings are adapted to receive the bar.

The top member of the vertical restraining component is adapted to receive the top of a wheel and is positioned at approximately a ninety degree angle relative to the vertical member. Likewise, the lip of the vertical restraining component is positioned at approximately a ninety angle relative to the top member and extends downwards towards the ground. In some embodiments, the top member defines a plurality of slits and the lock receiving bore.

A horizontal restraining component is adapted to be received between the side member, the bottom member, and the lip of the base component. In some embodiments, the horizontal restraining component comprises a first wall integrally connected to a second wall at about a ninety degree angle. The first wall defines a pair of notches which are adapted to receive a pair of nuts and bolts, and the length between the pair of notches is the same as the length between the pair of parallel slots defined by the side member of the base component. In this manner, the horizontal restraining component is slidably connected to the inner face of the base component and can be adjusted to secure wheels of different lengths.

According to multiple embodiments and alternatives, a width restraining component is slidably connected to the inner face of the second wall of the horizontal restraining component. In some embodiments, the width restraining component comprises a first wall integrally connected to a second wall at about a ninety degree angle. The first wall defines a pair of notches which are separated by a length that is equal to the length between the pair of slots defined by the inner face of the second wall of the horizontal restraining component. Accordingly, the width restraining component is slidably connected to the horizontal restraining component and can be adjusted to secure wheels having different widths. In some embodiments, the various corners and edges of the components are rounded.

Accordingly, the wheel locking device provides a number of advantages over conventional training machines and apparatuses, along with other features disclosed herein.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing Figures described and provided herein are not to scale, and that the embodiments are not limited to the precise arrangements and instrumentalities shown.

MULTIPLE EMBODIMENTS AND ALTERNATIVES

Figure 1:
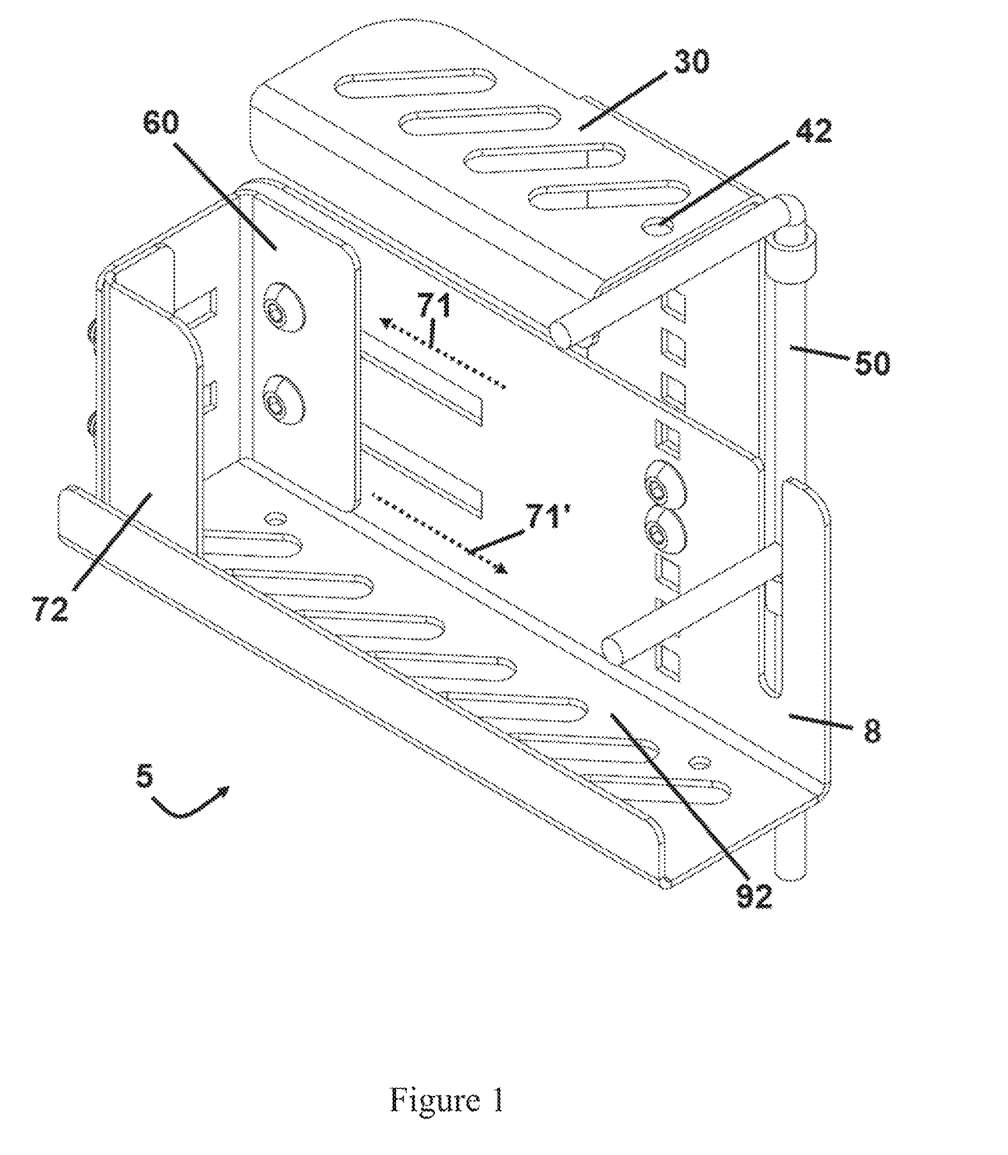
FIG. 1 is a perspective view of a wheel locking device, according to multiple embodiments and alternatives.

FIG. 1 illustrates a wheel locking device 5 comprising base component 8 which is adjustably connected to vertical restraining component 30. An L-shaped horizontal restraining component 60 is slidably connected to base component 8, and in some embodiments, a width restraining component 72 is slidably connected to the horizontal restraining component 60 to form a C-shape. The components 8, 30, 60, and 72 are adapted to receive and restrain a wheel or a wheeled apparatus. As discussed in greater detail below, a user can adjust device 5 to accommodate wheels of different diameters by changing the position of the vertical restraining component 30 relative to base component 8. Herein, a "user" refers to an individual utilizing the wheel locking device 5. Likewise, a user can adjust device 5 to accommodate wheels of different diameters by moving horizontal restraining component 60 inwards along arrow 71' or outwards along arrow 71 (illustrated in FIG. 1). In some embodiments, a user can also adjust device 5 to the specific width of a wheel by sliding width restraining component 72 inwards along arrow 82' or outwards along arrow 82 (illustrated in FIG. 4). The wheel locking device 5 further comprises a bar 50 which can be rotated and adjusted to secure a wheel in place to device 5.

Figure 2:
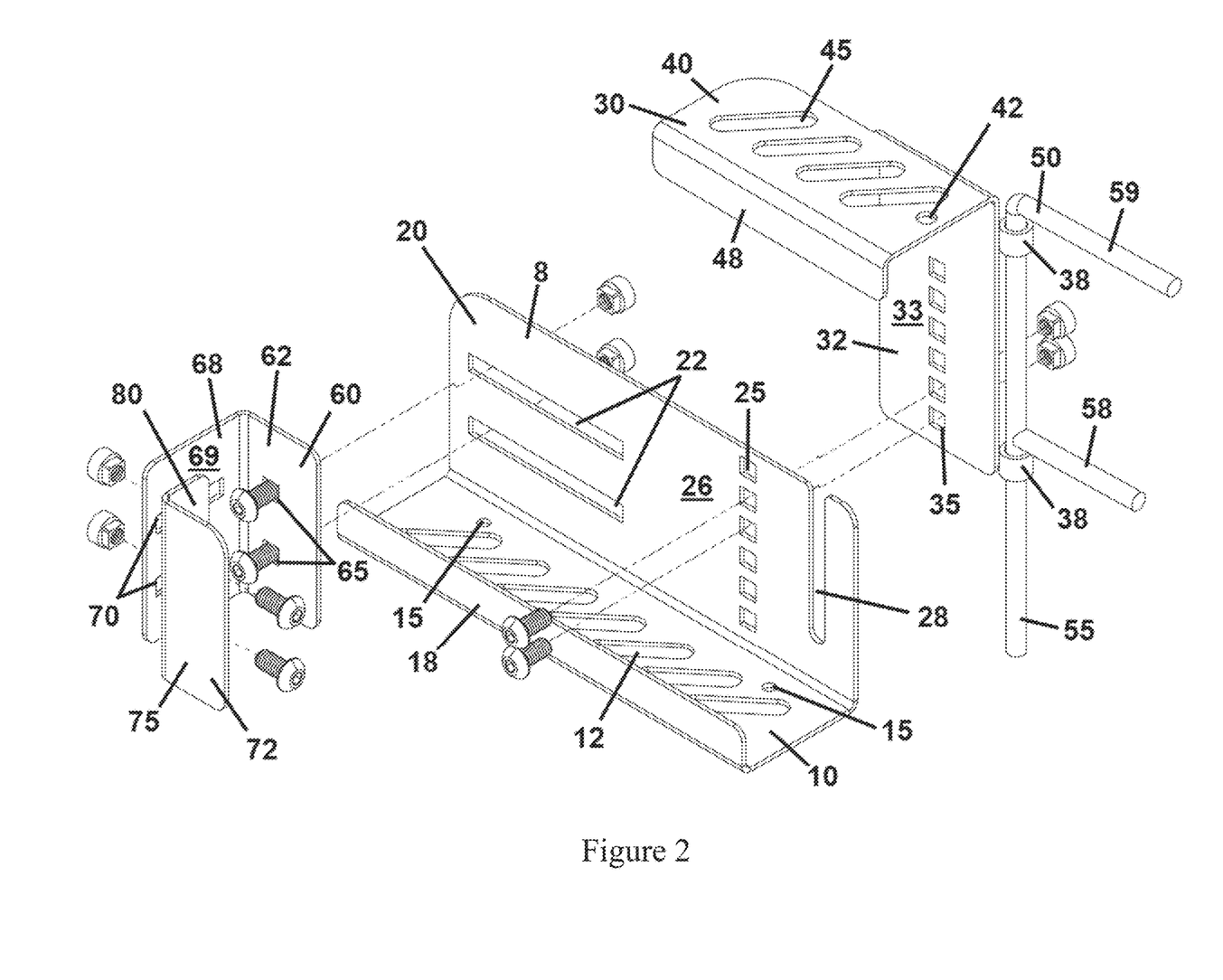
FIG. 2 is an exploded view of a wheel locking device, according to multiple embodiments and alternatives.

FIG. 2 illustrates an exploded view of the wheel locking device 5. As shown in FIG. 2, the base component 8 comprises a bottom member 10 having a pair of opposing lengths. A lip 18 is integrally connected to one of the opposing lengths and extends upwards, at approximately a ninety degree angle, from the bottom member 10. A side member 20 is integrally connected to the other opposing length and also extends upwardly at approximately a ninety degree angle from the bottom member 10. The bottom member 10 defines a plurality of slits 12 and a pair of screw receiving bores 15.

The side member 20 defines a plurality of notches 25 which span from the bottom to the top of the side member 20. In some embodiments, the notches 25 are square shaped and are adapted to receive corresponding square-shaped nuts and bolts; however, any number of shapes (e.g. circular as a non-limiting example) may be utilized as known to one of ordinary skill in the art. The side member 20 further defines a groove 28 which is positioned distal to the notches 25 and the groove 28 is adapted to receive the bar 50. The side member 20 also defines a pair of slots 22. In some embodiments, the slots 22 are parallel and are adapted to receive a pair of nuts and bolts (as a non-limiting example) that slidably connect the horizontal restraining component 60 to the inner face 26 of the side member 20.

As illustrated in FIG. 2, the vertical restraining component 30 comprises a vertical member 32 that is integrally connected to a top member 40 (at approximately a ninety degree angle), which in turn is connected to a lip 48 which extends towards the ground and is positioned at approximately a ninety degree angle relative to the top member 40. The vertical member 32 comprises an inner face 33 that defines a plurality of notches 35 (which correspond to the plurality of notches 25 defined by the side member 20 of the base component 8). An edge of the vertical member 32 is connected to a pair of housings 38 which are adapted to receive the bar 50. The top member 40 defines a lock receiving bore 42 positioned adjacent to one of its edges and the top member 40 further defines a plurality of slits 45.

Figure 3:
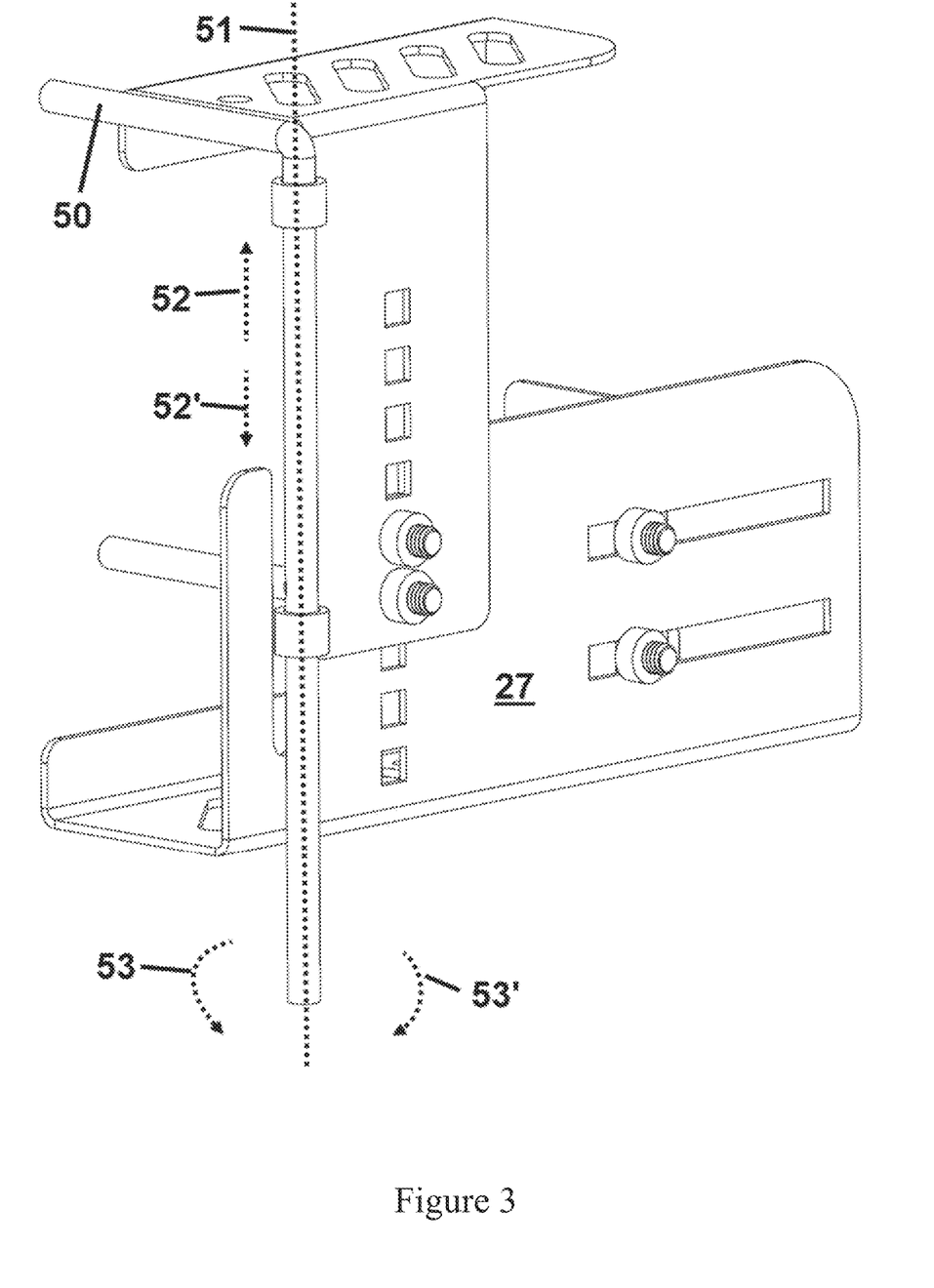
FIG. 3 is a perspective view of a wheel locking device, according to multiple embodiments and alternatives.

The bar 50 comprises a vertical shaft 55, a first horizontal shaft 58, and a second horizontal shaft 59. The first horizontal shaft 58 extends outwardly from approximately the middle of the vertical shaft 55, and the second horizontal shaft 59 extends outwardly from the top of the vertical shaft 55. As shown in FIG. 3, bar 50 is received within the pair of housings 38 and the vertical shaft 55 defines a bar axis 51. Herein, the term "axis" refers to an imaginary line about which rotation occurs. In this manner, when bar 50 is received within the pair of housings 38, bar 50 rotates about bar axis 51 along arrows 53' or arrow 53. Bar 50 also moves upwards along arrow 52 or downwards along arrow 52'.

The horizontal restraining component 60 comprises a first wall 62 integrally connected to a second wall 68 at approximately a ninety degree angle. The first wall 62 defines a pair of notches 65 which are adapted to receive a pair of nuts and bolts. The pair of notches 65 are positioned the same length apart as the distance between the pair of slots 22 (which are defined by the side member 20 of the base component 8). In this manner, the horizontal restraining component 60 is slidably connected to the inner face 26 of the side member 20. In some embodiments, the second wall 68 further comprises an inner face 69 which defines a pair of slots 70 that are adapted to receive a pair of nuts and bolts (as a non-limiting example) that slidably connect the width restraining component 72 to the inner face 69 of the second wall 68. The horizontal restraining component 60 is adapted to be received within the bottom member 10 of the base component 8.

Figure 4:
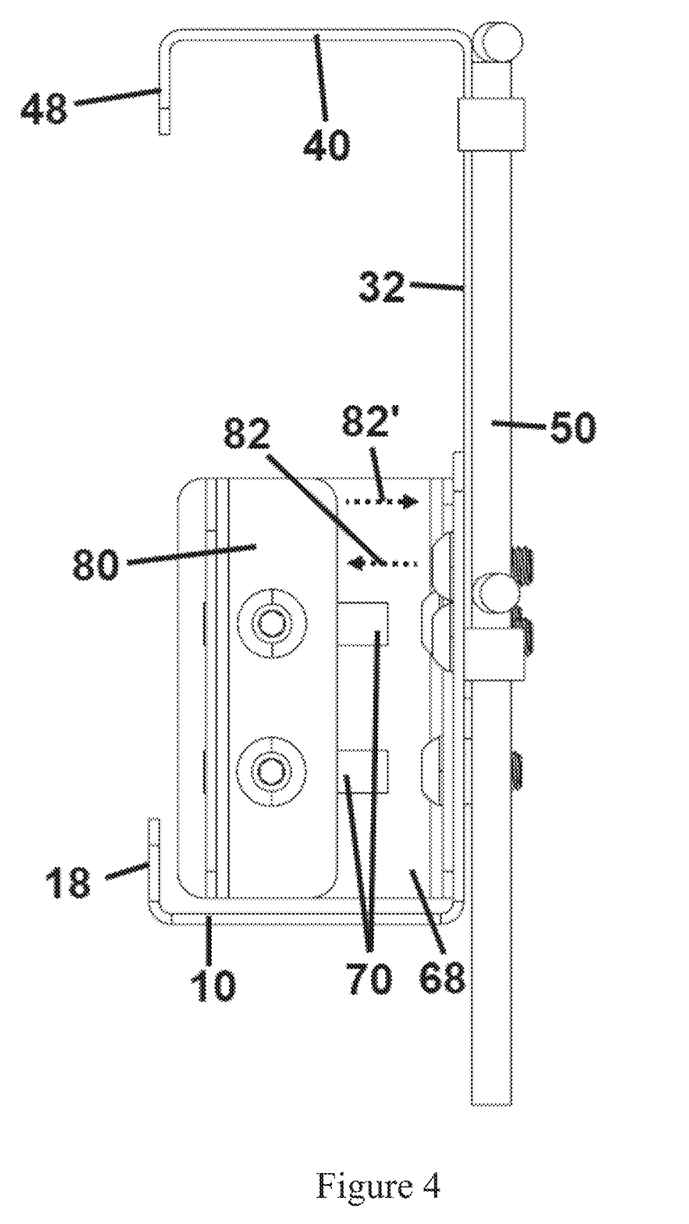
FIG. 4 is a front view of a wheel locking device, according to multiple embodiments and alternatives.

In some embodiments, the width restraining component 72 comprises a first wall 75 integrally connected to a second wall 80. The second wall 80 defines a pair of notches 78 (not illustrated) which are adapted to receive a pair of nuts and bolts. The pair of notches 78 are positioned the same distance apart as the distance between the pair of slots 70 that are defined by the second wall 68 of the horizontal restraining component 60. As shown in FIG. 4, it will be appreciated that this configuration permits the width restraining component 72 to be slidably connected to the horizontal restraining component 60 and forms a C-shape. In this manner, the width restraining component can slide inwardly along arrow 82' or outwardly along arrow 82.

Accordingly, the plurality of notches 25 are aligned with the corresponding plurality of notches 35, and a pair of nuts and bolts (not numbered) adjustably secure the base component 8 to the vertical restraining component 30. In this manner, the inner face 33 of the vertical member 32 engages, and is secured to, the outer face 27 (illustrated in FIG. 3) of the side member 20. The pair of notches 65 are aligned with the pair of slots 22 and a pair of nuts and bolts (not numbered) slidably connect the horizontal restraining component 60 to the inner face 26 of the side member 20. In some embodiments, the pair of notches 78 (not illustrated) of the width restraining component 72 are aligned with the pair of slots 70, and a pair of nuts and bolts (not numbered) slidably connect the width restraining component 72 to the inner face 69 of the second wall 68 of the horizontal restraining component 60.

Figure 5:
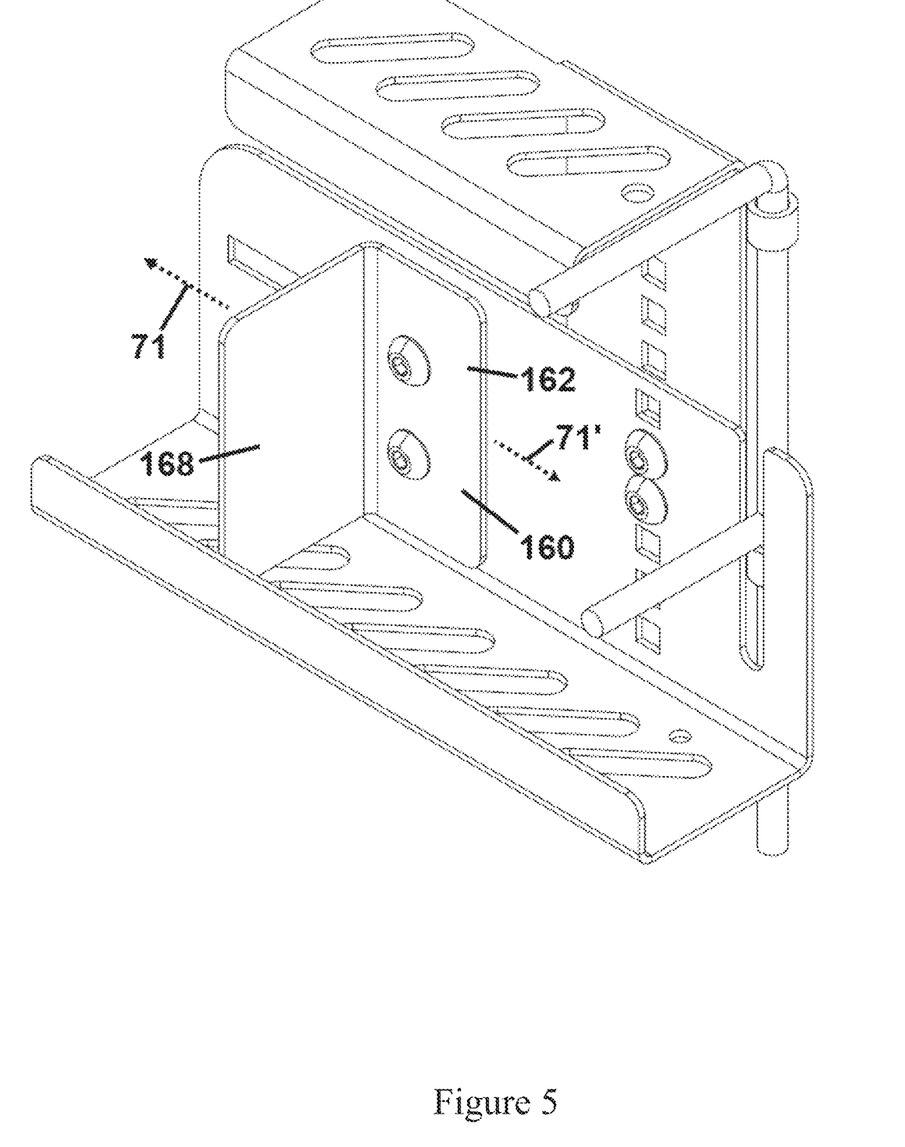
FIG. 5 is a perspective view of a wheel locking device, according to multiple embodiments and alternatives.
Figure 6:
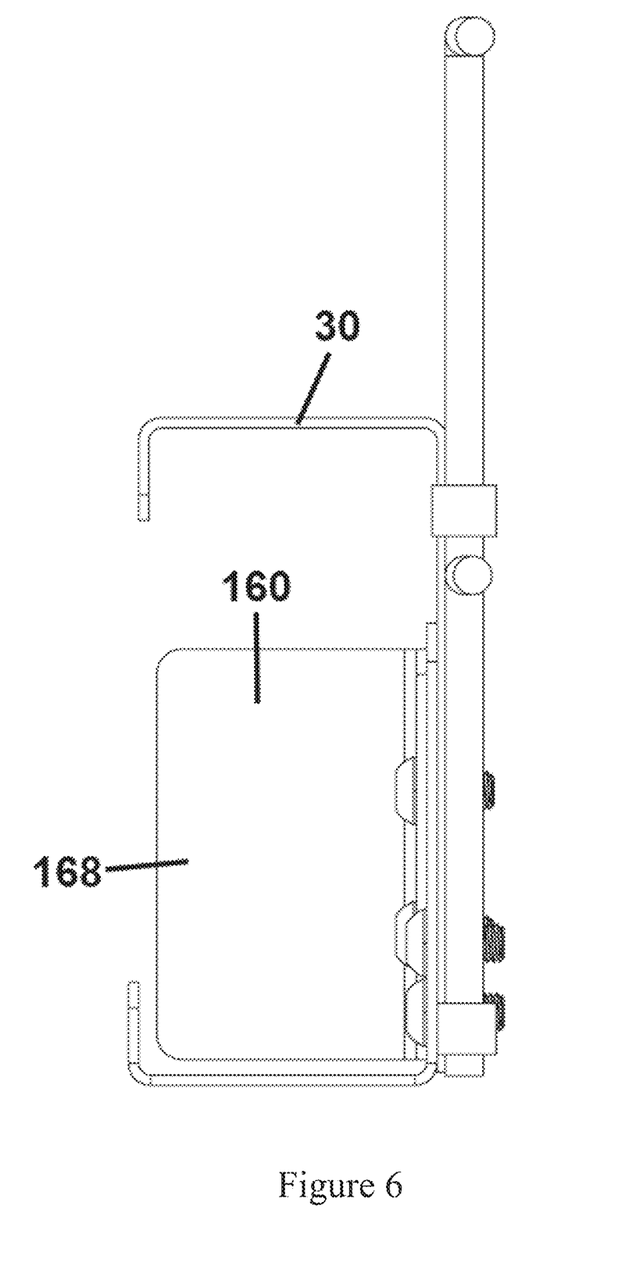
FIG. 6 is a front view of a wheel locking device, according to multiple embodiments and alternatives.

FIGS. 5 and 6 illustrate wheel locking device 5 lacking an adjustable width, according to multiple embodiments and alternatives. In FIG. 5, there is no width restraining component 72. Rather, the wheel locking device 5 in FIG. 5 comprises a horizontal restraining component 160 having a first wall 162 integrally connected to a second wall 168 to form an L-shape. The first wall 162 defines a pair of notches 165 (not illustrated) which are adapted to receive a pair of nuts and bolts that allow the first wall 162 to slidably engage the inner face 26 of the side member 20; and permit the horizontal restraining component 160 to move inwardly along arrow 71' or outwardly along arrow 71. The second wall 168 lacks any slots and is not configured to receive a width restraining component 72.

Furthermore, the height of the device 5 in FIG. 6 is shorter than the height of the device 5 illustrated in FIG. 4. Accordingly, between FIGS. 4 and 6, the position of the vertical restraining component 30 relative to the base component 8 has changed. It be will be appreciated by one of ordinary skill in the art that a user may adjust the height of the device 5 as desired to secure wheels of different diameters.

Figure 7:
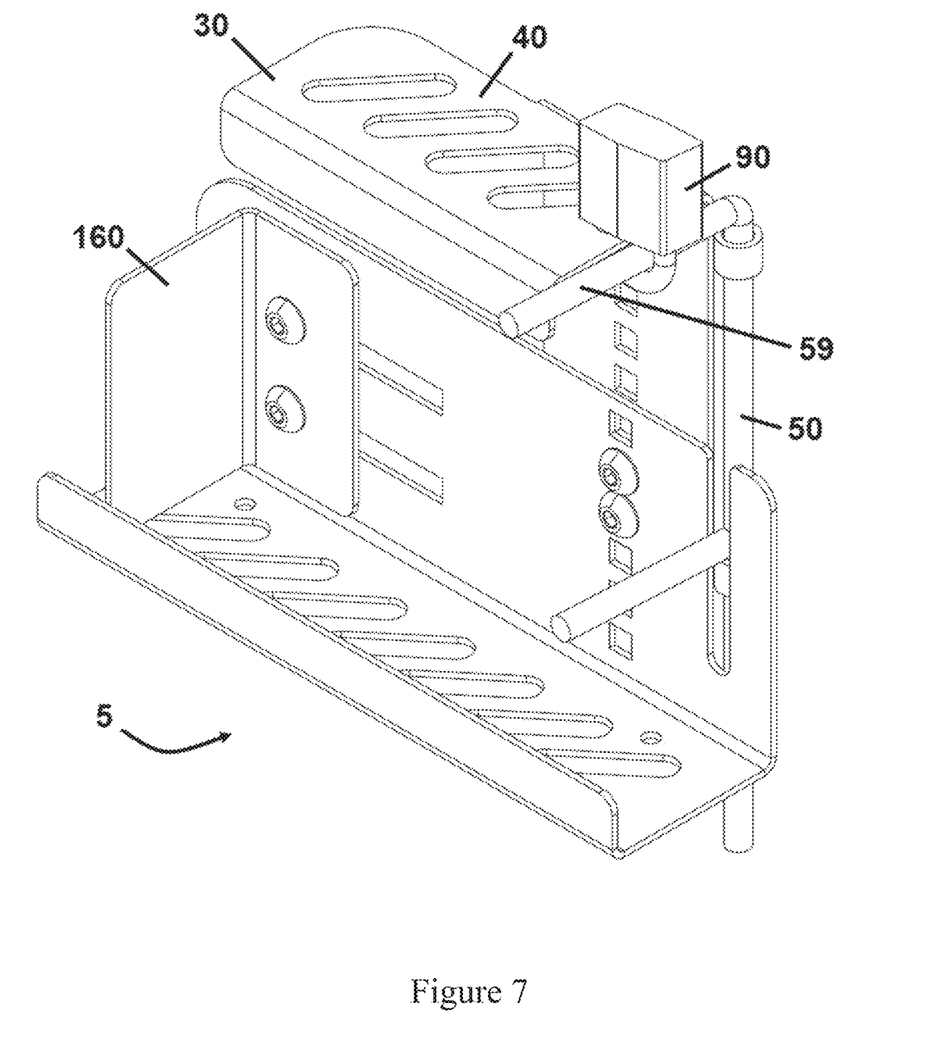
FIG. 7 is a perspective view of a wheel locking device and a padlock, according to multiple embodiments and alternatives.

As previously noted, FIG. 3 illustrates bar 50 rotating about bar axis 51 along arrows 53, 53' and bar 50 moving upwards or downwards along arrows 52, 52'. Starting from the position illustrated in FIG. 1, when a user is ready for the wheel locking device 5 to receive a wheel, the user can lift bar 50 upwards along arrow 52 until the first horizontal shaft 58 is no longer received within the groove 28. As shown in FIG. 4, the user can then rotate the bar 50 along arrow 53 until the horizontal shafts 58, 59 are positioned away from device 5. A user can then push the wheel along the bottom member 10 until the wheel engages either the width restraining component 72 or the horizontal restraining component 160, according to multiple embodiments and alternatives. Once positioned, the user can secure the wheel in place by rotating bar 50 along arrow 53', and then moving bar 50 downwards until the first horizontal shaft 58 is received within the groove 28 and the horizontal shafts 58, 59 engage the respective housings 38. In some embodiments, a user can secure the top member 40 of the vertical restraining component 30 to the second horizontal shaft 59 of the bar 50 by inserting an unlocked padlock 90 (as a non-limiting example) into the lock receiving bore 42, about the second horizontal shaft 59, and then locking the padlock 90. As shown in FIG. 7, the padlock 90 secures the second horizontal shaft 59 to the vertical restraining component 30, and thus can secure a wheel or a wheeled apparatus within device 5. Accordingly, the second horizontal shaft 59 is adapted to rotatably engage the external edge of the top member 40 in a lockable position.

Figure 8A:
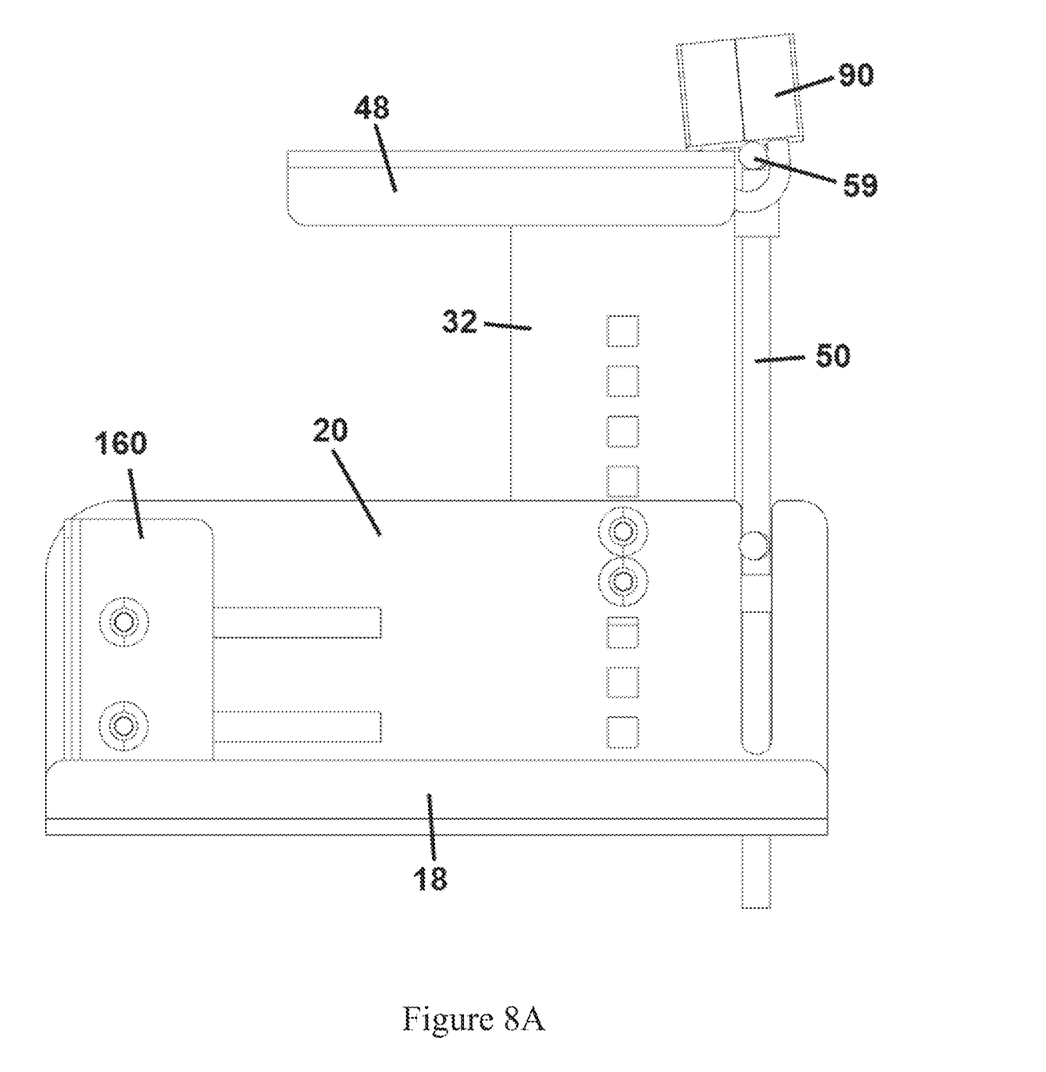
FIG. 8A is a side view of a wheel locking device and a padlock, according to multiple embodiments and alternatives.
Figure 8B:
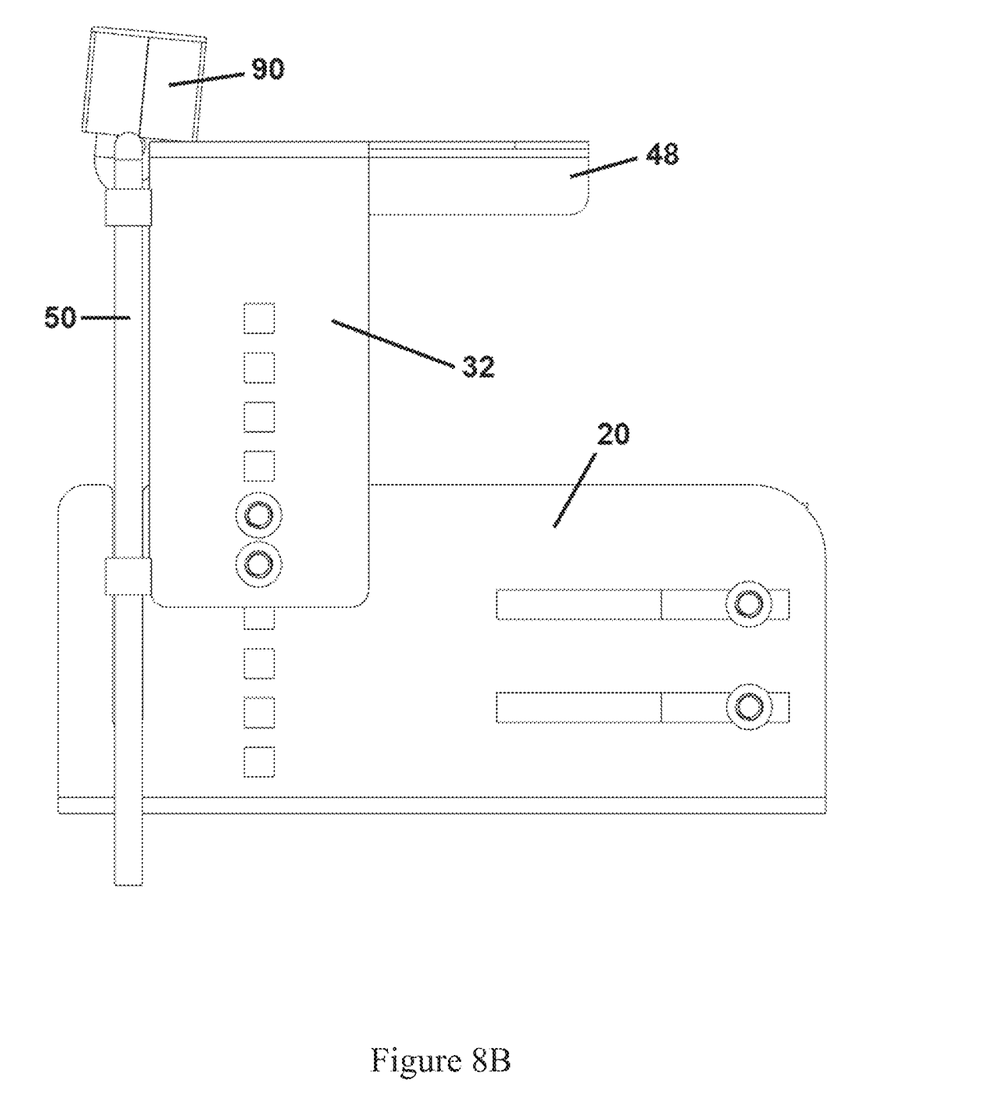
FIG. 8B is a side view of the wheel locking device illustrated in FIG. 8A.
Figure 8C:
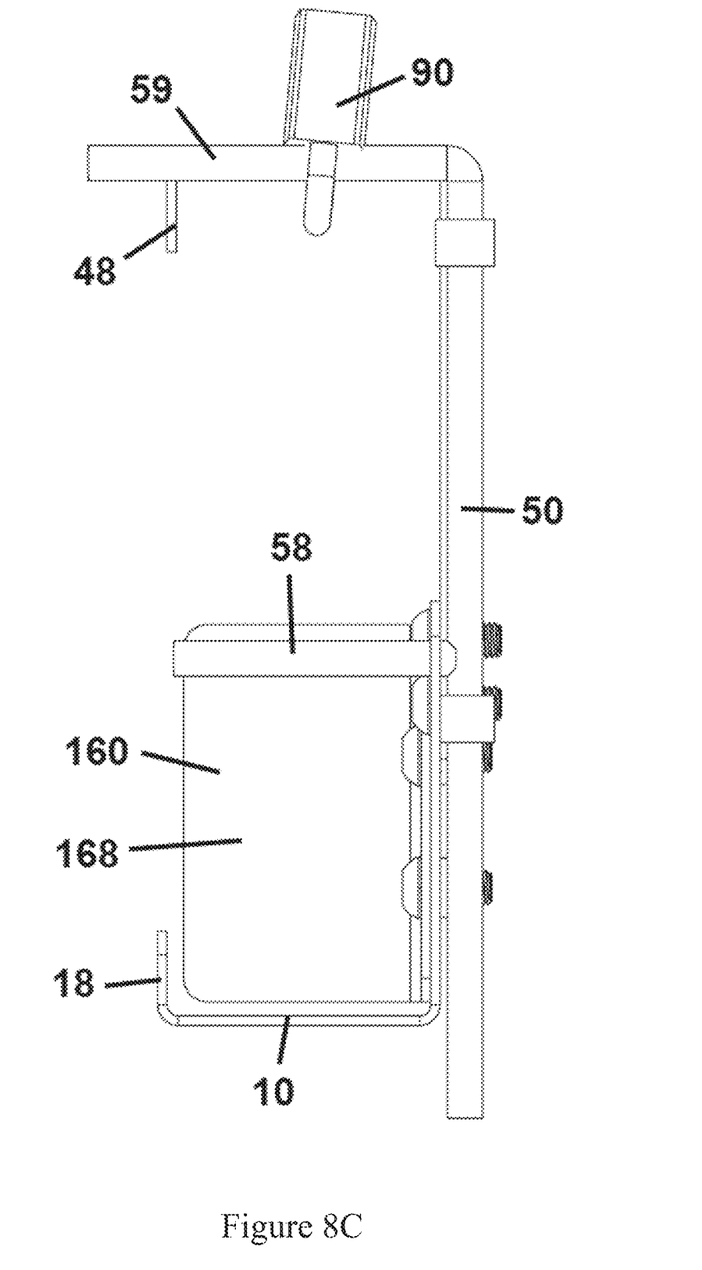
FIG. 8C is a front view of the wheel locking device illustrated in FIGS. 8A-8B.

FIGS. 8A-8C illustrate a number of views of a padlock 90 received within the lock receiving bore 42 and securing the second horizontal shaft 59 to the top member 40 of the vertical restraining component 30. It will be appreciated that alternatives to the padlock 90 could be utilized, such as a wire lock clevis pin and other locks known to one of ordinary skill in the art.

Figure 9:
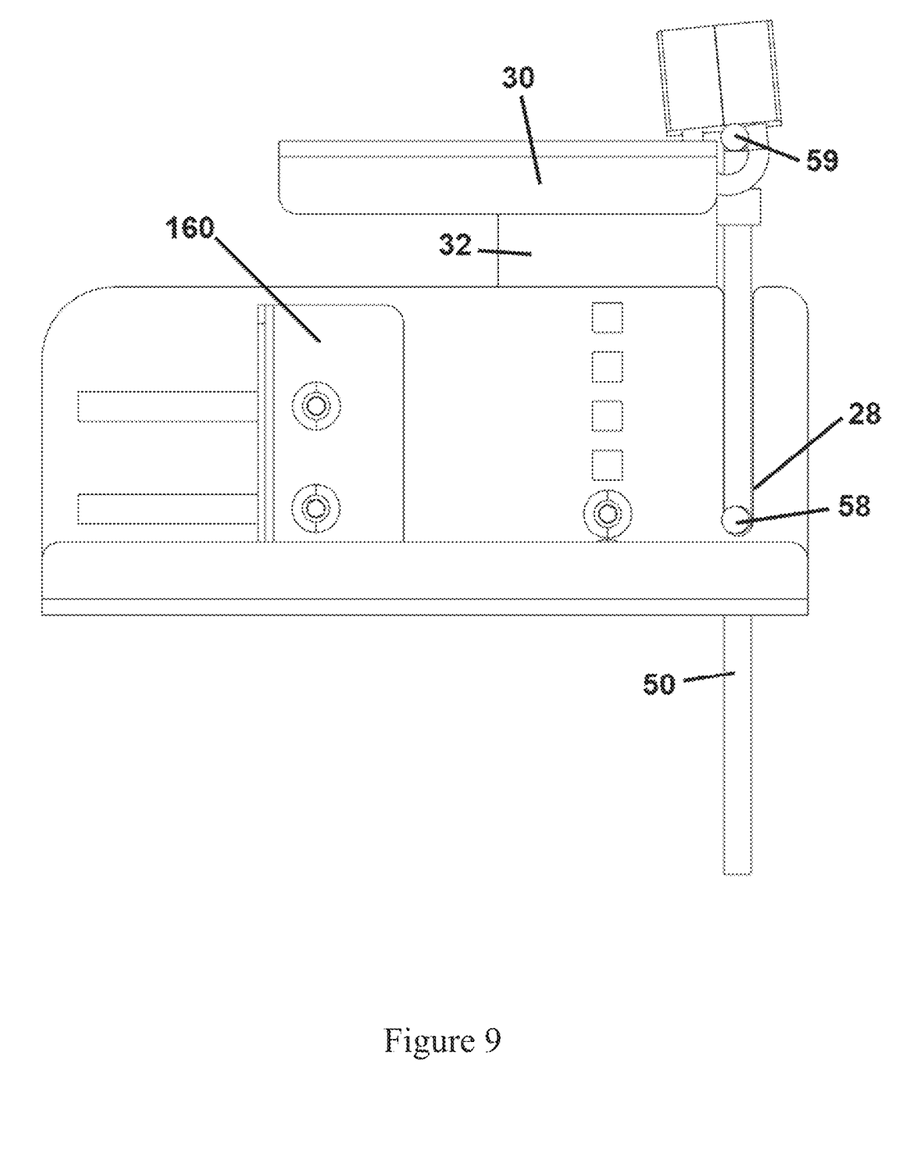
FIG. 9 is a side view of a wheel locking device and a padlock, according to multiple embodiments and alternatives.

In FIG. 9, the vertical restraining component 30 is secured to the base component 8 in a lower position as compared to FIG. 8A. Accordingly, it will be appreciated that a user can adjust the height of the device 5 by adjusting where the vertical restraining component 30 is secured to the base component 8. In this manner, a user can remove the respective nuts and bolts, move the vertical restraining component 30 to the desired position, then re-insert and secure the nuts and bolts. As the vertical restraining component 30 is secured lower to the ground, the bottom of the bar 50 is positioned further below the bottom member 10 of the base component 8.

Figure 10A:
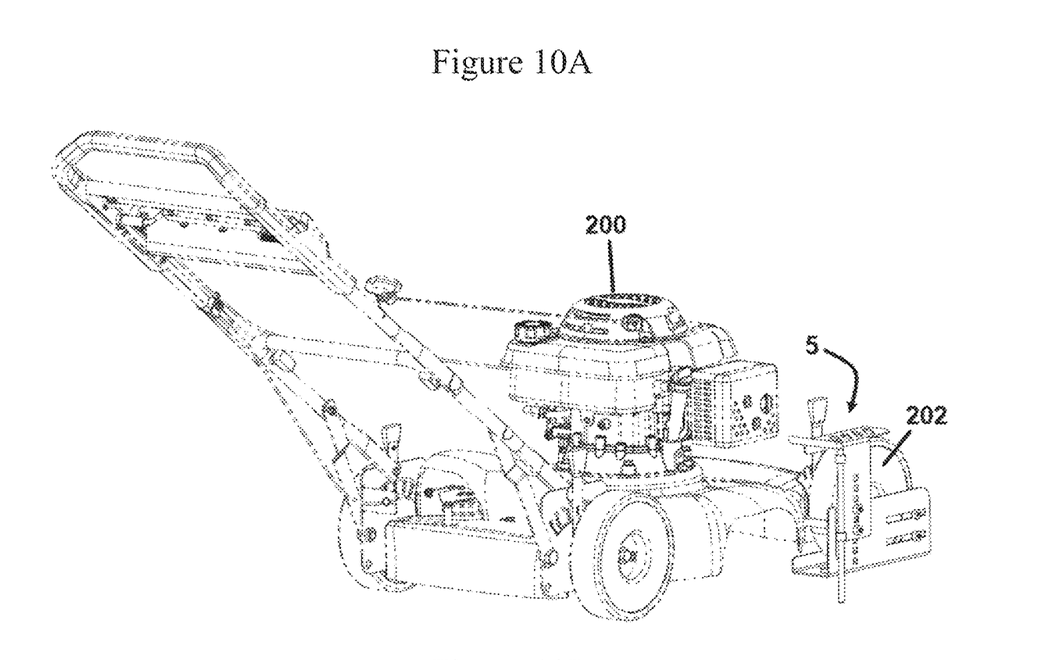
FIG. 10A is a perspective view of an embodiment of a wheel locking device demonstrating one application of the device, according to multiple embodiments and alternatives.
Figure 10B:
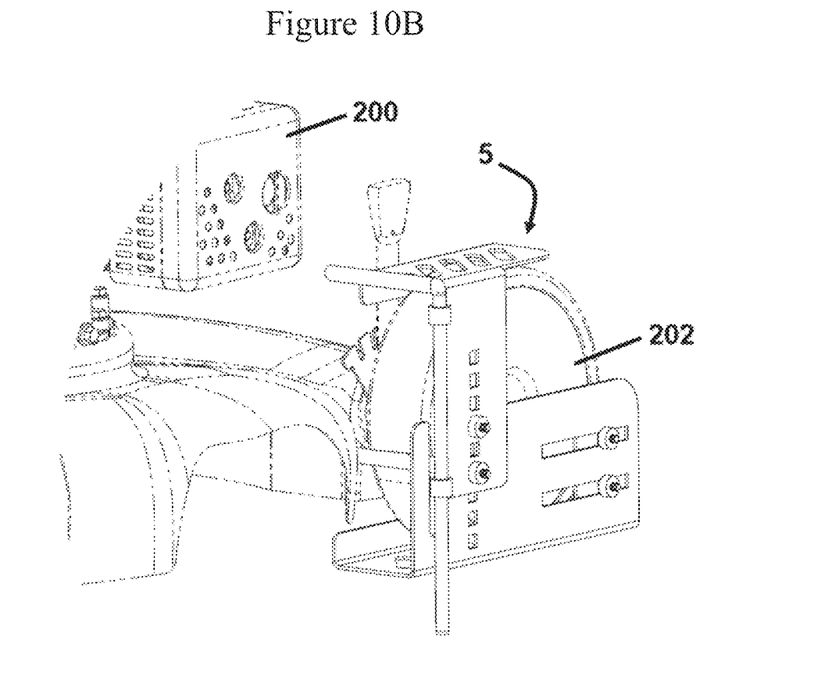
FIG. 10B is a close-up view of the wheel locking device illustrated in FIG. 10A, according to multiple embodiments and alternatives.

FIGS. 10A-10B illustrate the wheel 202 of a lawn mower 200 in broken lines (as a non-limiting example) secured to a wheel locking device 5. In FIGS. 10A-10B, the wheel 202 of the mower 200 (as a non-limiting example) is received within the device 5, and the second horizontal shaft 59 is engaged with the top member 40 of the vertical restraining component 30. It will be appreciated that a user can adjust the height, the length, or the width of device 5 to accommodate wheels of different diameters, and a user can utilize padlock 90 to secure the second horizontal shaft 59 to the top member 40 of the vertical restraining component 30

In operation, a user will move bar 50 upwards along arrow 52 until the first horizontal shaft 58 is no longer received within groove 28. The user will then rotate bar 50 along arrow 53 until the shafts 58, 59 are clear of the device 5 (as shown in FIGS. 4 and 6). In this position, a user can push the wheel of a device (or a wheel) on to the bottom member 10 until the wheel engages either the horizontal restraining component 160 or the width restraining component 72, according to multiple embodiments and alternatives. In this position, the user can slidably adjust the horizontal restraining component 60 (or 160) along arrows 71', 71 (shown in FIGS. 1 & 5) as needed to secure wheels having different diameters. The user can also adjust the height of the device 5 by changing where the vertical restraining component 30 is secured to the base component 8. Likewise, in some embodiments, a user can also adjust device 5 to the specific width of a wheel by sliding width restraining component 72 inwards along arrow 82' or outwards along arrow 82 (shown in FIG. 4). Once the wheel is positioned and secured within device 5, a user can rotate bar 50 along arrow 53' and then lower the bar 50 until the first horizontal shaft 58 is received within groove 28, and the shafts 58, 59 engage the respective housing 38. As shown in FIG. 10B, a user can then insert an unlocked padlock 90 (as a non-limiting example) into the lock receiving bore 42, about the second horizontal shaft 59, and then lock the padlock 90. If the user desires to secure the wheel locking device 5 to a surface, the user can insert a pair of screws into the screw receiving bores 15 and securely attached the bottom member 10 to said surface.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A wheel locking device, comprising:
a base component; and
a vertical restraining component adjustably connected to an external side of the base component;
wherein the base component and the vertical restraining component are adapted to receive a wheel;
wherein the vertical restraining component comprises a vertical member being integrally connected to a top member;
further comprising a bar rotatably connected to an external edge of the vertical member of the vertical restraining component;
wherein the bar further comprises a vertical shaft, a first horizontal shaft, and a second horizontal shaft; and
wherein the first horizontal shaft extends outwardly from a middle portion of the vertical shaft and the second horizontal shaft extends outwardly from a top end of the vertical shaft.

2. The wheel locking device of claim 1, wherein the second horizontal shaft is adapted to rotatably engage an external edge of said top member in a lockable position; and
wherein the top member of the vertical restraining component defines a lock receiving bore being adapted to receive a lock and positioned adjacent to the external edge of said top member, wherein said lock receiving bore permits said second horizontal shaft to be locked in the lockable position against said top member.

3. The wheel locking device of claim 2, wherein the base component comprises a bottom member having a first opposing length and a second opposing length;
wherein a lip is integrally connected to the first opposing length of the bottom member and extends upwards from said bottom member;
wherein a side member is integrally connected to the second opposing length of the bottom member and extends upwards from said bottom member; and
wherein an internal side of the vertical member of the vertical restraining component is adjustably connected to an external side of the side member of the base component.

4. The wheel locking device of claim 3, wherein the side member of the base component defines a plurality of notches spanning from a bottom edge to a top edge of the side member;
wherein the vertical member of the vertical restraining member defines a plurality of notches spanning from a bottom edge to a top edge of the vertical member; and
wherein the plurality of notches of the side member of the base component correspond with the plurality of notches of the vertical restraining member.

5. The wheel locking device of claim 4, wherein each of the plurality of notches of the side member and the plurality of notches of the vertical restraining member are adapted to receive at least one nut and bolt; and
wherein said at least one nut and bolt are adapted to adjustably secure the internal side of the vertical member of the vertical restraining member to the external side of the side member of the base component.

6. The wheel locking device of claim 4, wherein the side member of the base component defines a groove being adapted to receive the first horizontal bar;
wherein the groove is positioned distal to the plurality of notches of the side member of the base component; and
wherein said first horizontal bar is adapted to contain the wheel within the base component and the vertical restraining component when the first horizontal bar is received in the groove and said first horizontal bar extends through the side member of the bottom member.

7. The wheel locking device of claim 4, further comprising a horizontal restraining component having a first wall integrally connected to a second wall at about a ninety degree angle;
wherein an external side of the first wall is slidably connected to an internal side of the side member of the base component.

8. The wheel locking device of claim 7, wherein the horizontal restraining component is adapted to be received between the side member, the bottom member, and the lip of the base component; and
wherein the base component, the vertical restraining component, and the horizontal restraining component are adapted to receive the wheel.

9. The wheel locking device of claim 8, wherein the side member of the base component defines a pair of slots;
wherein the first wall of the horizontal restraining member defines a pair of notches corresponding to the pair of slots of the side member;
wherein the pair of notches of the first wall of the horizontal restraining member and the pair of slots are adapted to receive at least one nut and bolt; and
wherein said at least one nut and bolt are adapted to adjustably connect the external side of the first wall of the horizontal restraining member to the internal side of the side member of the base component.

10. A wheel locking device, comprising:
a base component having a bottom member, said bottom member having a first opposing length and a second opposing length, wherein a lip is integrally connected to the first opposing length of the bottom member and extends upwards from said bottom member, wherein a side member is integrally connected to the second opposing length of the bottom member and extends upwards from said bottom member;
a vertical restraining component having a vertical member being integrally connected to a top member;

a bar rotatably connected to an external edge of the vertical member of the vertical restraining component; and a horizontal restraining component adapted to be received between the side member, the bottom member, and the lip of the base component;

wherein an internal side of the vertical member of the vertical restraining component is adjustably connected to an external side of the side member of the base component, wherein the horizontal restraining component is adjustably connected to an internal side of the side member of the base component;

wherein the base component, the vertical restraining component, and the horizontal restraining component are adapted to receive a wheel;

wherein the bar further comprises a vertical shaft, a first horizontal shaft, and a second horizontal shaft;

wherein the first horizontal shaft extends outwardly from a middle portion of the vertical shaft and the second horizontal shaft extends outwardly from a top end of the vertical shaft; and wherein the vertical shaft defines a bar axis about which the bar rotates.

11. The wheel locking device of claim 10, wherein a pair of housings are connected to the external edge of the vertical member of the vertical restraining component, said pair of housings being adapted to receive said bar; and wherein the bar is adapted to move vertically within said pair of housings.

12. The wheel locking device of claim 11, wherein the side member of the base component defines a groove being adapted to receive the first horizontal bar;

wherein the second horizontal shaft is adapted to rotatably engage an external edge of said top member in a lockable position;

wherein the top member of the vertical restraining component defines a lock receiving bore being adapted to receive a lock and positioned adjacent to the external edge of said top member, wherein said lock receiving bore permits said second horizontal shaft to be locked in the lockable position against said top member; and wherein said first horizontal bar is adapted to contain the wheel within the base component and the vertical restraining component when the first horizontal bar is received in the groove and said first horizontal bar extends through the side member of the bottom member.

13. The wheel locking device of claim 12, wherein the horizontal restraining component comprises a first wall integrally connected to a second wall at about a ninety degree angle; and wherein an external side of the first wall is slidably connected to the internal side of the side member of the base component.

14. The wheel locking device of claim 13, further comprising a width restraining component slidably connected to an internal side of the second wall of the horizontal restraining component.

15. A wheel locking device, comprising:

a base component having a bottom member being adapted to engage a flat surface, said bottom member having a first opposing length and a second opposing length, wherein a lip is integrally connected to the first opposing length of the bottom member and extends upwards from said bottom member, wherein a side member is integrally connected to the second opposing length of the bottom member and extends upwards from said bottom member, wherein the side member of the base component defines a plurality of notches spanning from a bottom edge to a top edge of the side member, wherein the side member of the base component further defines a groove positioned distal to the plurality of notches of the side member;

a vertical restraining component having a vertical member being integrally connected to a top member at about a ninety degree angle, wherein the vertical member of the vertical restraining member defines a plurality of notches spanning from a bottom edge to a top edge of the vertical member, wherein the plurality of notches of the side member of the base component correspond with the plurality of notches of the vertical restraining member, wherein an internal side of the vertical member of the vertical restraining component is adjustably connected to an external side of the side member of the base component;

a pair of housings connected to an external edge of the vertical member of the vertical restraining component;

a bar rotatably adapted to be received and move vertically in said pair of housings, said bar having a vertical shaft, a first horizontal shaft, and a second horizontal shaft, wherein the first horizontal shaft extends outwardly from a middle portion of the vertical shaft at about a ninety degree angle and the second horizontal shaft extends outwardly from a top end of the vertical shaft at about a ninety degree angle, wherein the vertical shaft defines a bar axis about which the bar rotates within said pair of housings, wherein the second horizontal shaft is adapted to rotatably engage an external edge of said top member in a lockable position and the first horizontal shaft is adapted to be received in the groove and extend through said side member of the base component;

a horizontal restraining component adapted to be received between the side member, the bottom member, and the lip of the base component, wherein the horizontal restraining component comprises a first wall integrally connected to a second wall at about a ninety degree angle, wherein an external side of the first wall is slidably connected to an internal side of the side member of the base component;

wherein the top member of the vertical restraining component defines a lock receiving bore being adapted to receive a lock and positioned adjacent to the external edge of said top member, wherein said lock receiving bore permits said second horizontal shaft to be locked in the lockable position against said top member; and wherein the base component, the vertical restraining component, and the horizontal restraining component are adapted to receive a wheel.

16. The wheel locking device of claim 15, wherein said first horizontal bar is adapted to contain the wheel within the base component and the vertical restraining component when the first horizontal bar is received in the groove and said first bar extends through the side member of the bottom member.

17. The wheel locking device of claim 16, further comprising a width restraining component having a first wall integrally connected to a second wall at about a ninety degree angle;

wherein the external side of the first wall of the width restraining component is slidably connected to an internal side of the second wall of the horizontal restraining component; and wherein the base component, the vertical restraining component, the horizontal restraining component, and width restraining component are adapted to receive the wheel.

* * * * *